United States Patent [19]
Peinovich

[11] Patent Number: 5,280,391
[45] Date of Patent: Jan. 18, 1994

[54] AUXILIARY VEHICLE MIRROR SYSTEM

[76] Inventor: Daniel Peinovich, 1022 Valerian Way, No. 1, Sunnyvale, Calif. 94086

[21] Appl. No.: 953,239

[22] Filed: Sep. 30, 1992

[51] Int. Cl.$^5$ .............................. B60R 1/10; G02B 5/08
[52] U.S. Cl. ..................................... 359/862; 359/613
[58] Field of Search ............... 359/862, 863, 857, 858, 359/859, 865, 613

[56] References Cited

U.S. PATENT DOCUMENTS

| | | | |
|---|---|---|---|
| 1,565,291 | 12/1925 | Pearch | 359/862 |
| 1,700,764 | 2/1929 | Wagstaff | 359/862 |
| 2,210,147 | 8/1940 | Griffith | 359/865 |
| 2,250,896 | 7/1941 | Stokebary | 359/862 |
| 2,796,003 | 6/1957 | Kaufman | 359/862 |
| 4,268,120 | 5/1981 | Jitsumori | 359/850 |
| 4,637,694 | 1/1987 | Castaneda | 359/865 |
| 4,890,908 | 1/1990 | Casey | 359/865 |
| 4,906,088 | 3/1990 | Casey | 359/865 |

FOREIGN PATENT DOCUMENTS

| | | | |
|---|---|---|---|
| 608849 | 8/1926 | France | 359/862 |
| 45167 | 7/1935 | France | 359/862 |
| 1127233 | 9/1968 | United Kingdom | 359/862 |

*Primary Examiner*—Jon W. Henry
*Attorney, Agent, or Firm*—Richard C. Litman

[57] ABSTRACT

An auxiliary vehicle mirror system which includes a first housing having a primary mirror for receiving images of road conditions forward of the vehicle, and a secondary adjustable, pivotally mounted mirror for transmitting the images to the driver of the vehicle. The housing is pivotally mounted on a jaw which in turn is mounted on a second housing covering a conventional side view mirror on either side of the vehicle. The first housing may be mounted on either side of the vehicle, and is provided with structure for blocking extraneous views from the driver in the form of fins, or alternatively, in the form of a clip-on cover.

19 Claims, 4 Drawing Sheets

AUXILIARY VEHICLE MIRROR SYSTEM

BACKGROUND OF THE INVENTION

1. Field of the Invention

The present invention relates to a mirror system for extending or enhancing the visual field available to the driver of an automotive vehicle. More particularly, this invention relates to an auxiliary vehicle mirror system which presents to the driver a forward view of the road ahead of his or her vehicle from a vantage point located directly above the existing conventional external rear view mirrors located on the automobile. With this invention the driver is provided with a forward view other than his or her direct line of sight which could be obstructed by other vehicles in that direct line of sight.

Automobiles with darkened windows, loaded station wagons, pick-up trucks, vans, trailers, etc., can all block the view of the road ahead, such that a driver cannot see whether the vehicles ahead are slowing down, or more importantly, braking, so that the driver can do the same with enough anticipation to avoid having to slam the brakes in a panic stop.

In heavy traffic it is difficult if not impossible to view the road conditions ahead, in order to prepare to slow down, to brake, to change lanes, to accelerate, or simply to know what is delaying traffic, whether an exit is approaching, etc. The mirror system of this invention makes automobile driving safer in heavy traffic, such as during rush-hour commuting. The third brake light currently provided on automobiles helps drivers of cars behind, while the "Look Ahead" feature of this invention directly helps its user.

The mirror system of this invention is not only useful but is easy to install, is inexpensive, and is aesthetically pleasant. The mirror system will fit most cars, installs in seconds and can be removed just as easily without damage to existing vehicle parts. Only a simple screwdriver is required.

2. Description of the Prior Art

Mirror systems which provide a driver with a forward view of the road conditions ahead of his or her vehicle are known in the prior art. U.S. Pat. No. 1,700,764, issued Feb. 5, 1929 to Walter S. Wagstaff discloses a periscopic type of mirror arrangement extending from within the car, near a conventional rear view mirror to the outside of the car. There is no disclosure by Wagstaff of mounting the periscopic arrangement on the rear view mirror.

U.S. Pat. No. 2,210,147, issued Aug. 6, 1940 to James E. Griffith discloses a mirror system wherein three individual mirrors are each independently mounted on a complex support whereby a driver may be provided with both a forward and rear view of road conditions. One of the mirrors is mounted within the vehicle while the other two mirrors are located outside the vehicle. There is no disclosure by Griffith of mounting the housing of one mirror system on the housing of another mirror system.

U.S. Pat. No. 2,796,003 issued Jun. 18, 1957 to William J. Kaufman discloses a periscopic device for automobiles wherein a rear view mirror is pivotally mounted on the housing of a mirror system for providing a forward view of road conditions, the mirror system and rear view mirror being mounted on a support which extends within the car. There is no disclosure by Kaufman of a mirror system for forward viewing of road conditions which is mounted on the housing of a conventional rear view mirror.

U.S. Pat. No. 4,268,120 issued May 19, 1981 to Tsuneharu Jitsumori discloses a single housing for mounting both a rear view mirror and a forward viewing mirror system. Jitsumori does not disclose a first mirror housing mounted on a second mirror housing.

U.S. Pat. No. 4,637,694 issued Jan. 20 1987 to Albert A. Costaneda discloses a complex structure for mounting an auxiliary mirror on the housing of a conventional rear view mirror. Costaneda does not disclose a jaw-like mounting structure which can be quickly and easily connected and disconnected from the housing of a second mirror.

U.S. Pat. No. 4,890,908 issued Jan. 2, 1990 and U.S. Pat. No. 4,906,088 issued Mar. 6, 1990, both to Everett R. Casey, disclose structure including a clamp or jaw for mounting an auxiliary mirror on the housing of a conventional rear view mirror.

SUMMARY OF THE INVENTION

None of the foregoing patents disclose the described invention as claimed herein. The auxiliary vehicle mirror system includes a housing made of any suitable material, and a clip or jaw type mount connected to the housing for mounting the housing on the upper wall of a conventional shell surrounding a conventional external side or rear view mirror. Included within the housing are two mirrors in a periscopic arrangement, the first or primary mirror reflecting the view ahead to the second mirror which reflects the view to the driver. The housing includes a transparent window to protect the primary mirror from road hazards such as stones or insects. The housing is provided with suitable means for blocking unwanted or confusing views through the housing front window between the mirrors from the driver.

The clip or jaw is suitably connected to the base of the housing and is designed to firmly clamp the housing to the top of the shell or housing covering the conventional rear view mirror mounted on the side of the vehicle. The clip or jaw is U-shaped and is formed of two parts, an upper half and a lower half. The housing is connected to the clip or jaw by a mounting screw, and the clip or jaw in turn is firmly connected to the shell or housing covering the conventional rear view mirror by a pair of clamping screws. An adjustable fit with the rear view mirror shell or housing is provided by means of an adhesive plate inserted between the lower half of the clip or jaw and the upper surface of the shell or housing covering the conventional rear view mirror.

It is an object of this invention to provide an auxiliary vehicle mirror system which will provide the driver of a vehicle with a forward view of the road ahead of the vehicle from a vantage point located outside of the vehicle.

It is a further object of this invention to provide an auxiliary vehicle mirror system which may be easily and quickly installed on the vehicle.

It is still a further object of this invention to provide an auxiliary vehicle mirror system which may be installed on either side of the vehicle.

It is an additional object of this invention to provide an auxiliary vehicle mirror system having a mounting means for mounting the system on an already present housing for a side or rear view mirror.

It is another object of this invention to provide an auxiliary vehicle mirror system having a mounting means which may be adapted to fit a number of different types of side view mirrors.

Other objects, features and advantages of this invention will become apparent from the following detailed description and the appended claimed, reference being had to the accompanying drawings forming a part of the specification, wherein like reference numerals designate corresponding parts of the several views.

DETAILED DESCRIPTION OF THE PREFERRED EMBODIMENT(s)

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology and terminology employed herein is for the purpose of description and not limitation.

Figure 1:
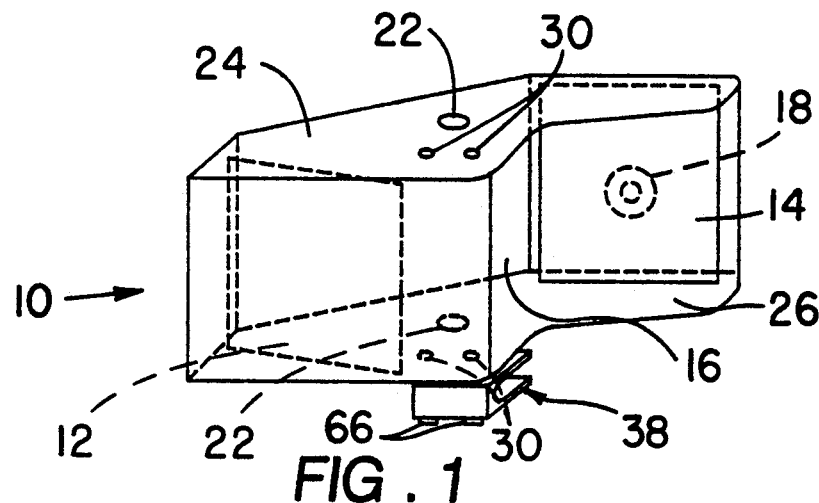
FIG. 1 is a perspective rear view of a first embodiment of the auxiliary vehicle mirror system.

Turning now to FIG. 1, there is shown of a first embodiment of the auxiliary vehicle mirror system which comprises a housing 10 formed of suitable material which may be plastic or metal. Housing 10 contains two mirrors 12 and 14 having a periscopic relationship. The first or primary mirror 12 is fixed relative to housing 10 to reflect the view ahead, transmitted through a transparent front window 16 which may be formed of glass or plastic, to the secondary mirror 14 which in turn reflects the view of the driver of a vehicle. Secondary mirror 14 is mounted on a conventional universal pivot 18 so as to be adjustable for viewing by the driver. Primary mirror 12 may be adjusted by rotating housing 10 about mounting screw 20.

Figure 2:
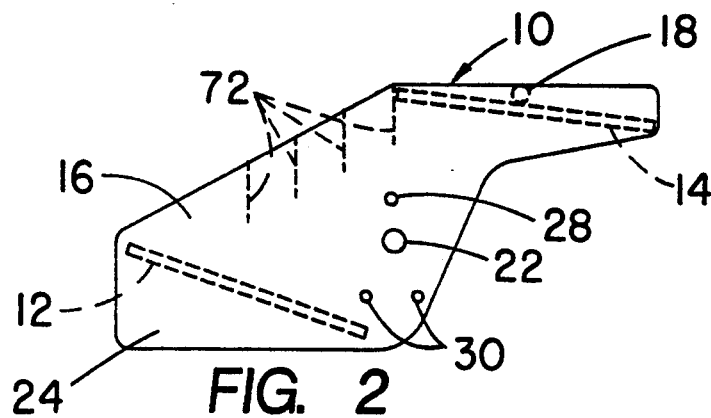
FIG. 2 is a top view of the first embodiment.
Figure 3:
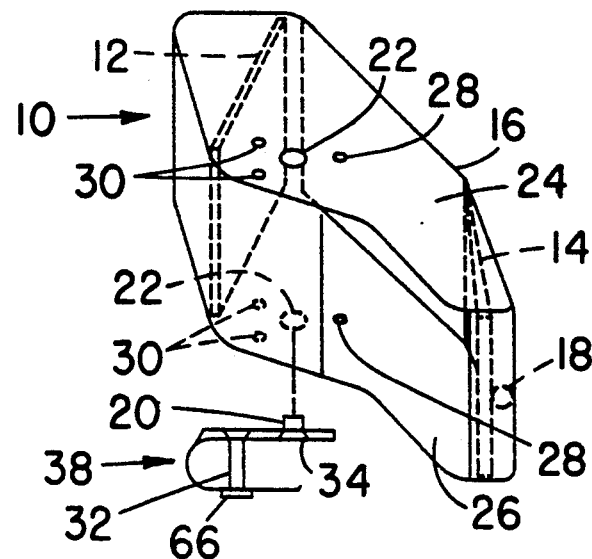
FIG. 3 is an exploded perspective view of the rear of the first embodiment as viewed from the right side of FIG. 1.

As shown in FIGS. 1, 2 and 3, a mounting screw hole 22 is provided in both the top surface 24 and bottom surface 26 of housing 10 for receiving mounting screw 20. This arrangement enables the housing 10 to be mounted on either the left side or the right side of the vehicle. Also provided in the top and bottom surfaces 24, 26 are threaded rotation stop screw holes 28 and access holes 30 providing access to clip or jaw clamping screws 32. The unused set of holes 22, 28 and 30 in the uppermost surface 24 or 26 may be covered by a simple four-pronged plug (not shown) or an adhesive plate (not shown) using the same material and having the same color as housing 10.

Figure 7:
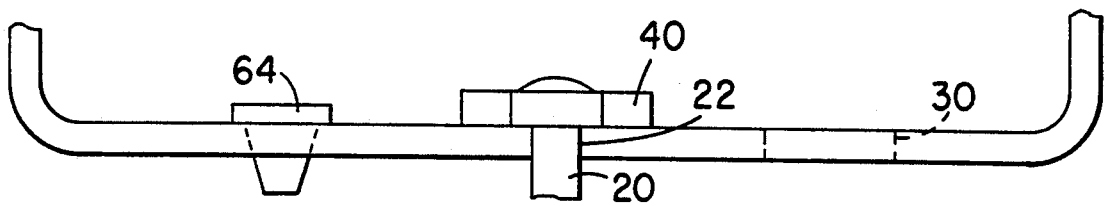
FIG. 7 is a sectional view of the housing of the first embodiment of the mirror system showing the location of the rotation stop screw, the captive nut mounting screw, and of a clamping screw access hole.

As shown in FIGS. 3 and 7, mounting screw 20 is inserted through a hole 34 provided in an upper jaw half 36 of clip or jaw 38 and through a lower mounting screw hole 22 in the lowermost surface 24 or 26. Mounting screw 20 is held in position by a nut 40. In the alternative, holes 22 or 34 may be threaded, and mounting screw 20 may be inserted first into a lower mounting screw hole 22 and screwed into a threaded hole 34.

Figure 4:
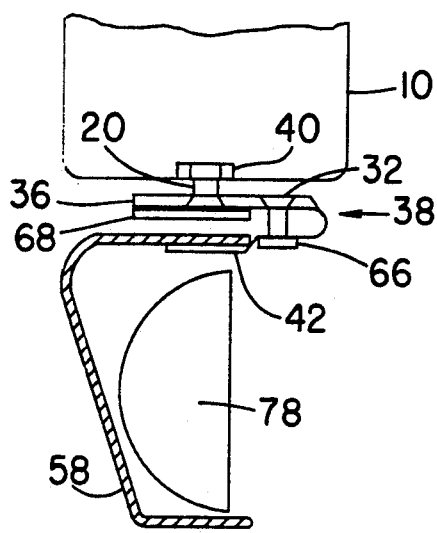
FIG. 4 is an end view partly in section of the first embodiment showing how the mounting means of the mirror system is mounted on the shell or housing covering a conventional side view mirror.
Figure 5:
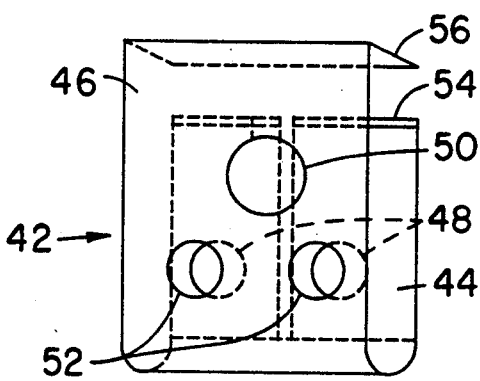
FIG. 5 is a top perspective view of the lower half of the clip or jaw for the mirror system.
Figure 6:
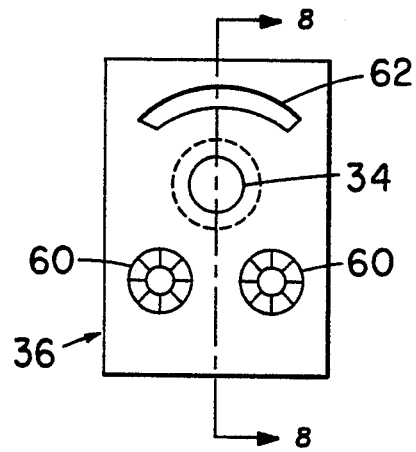
FIG. 6 is a top view of the upper half of the clip or jaw used with the first embodiment.
Figure 8:
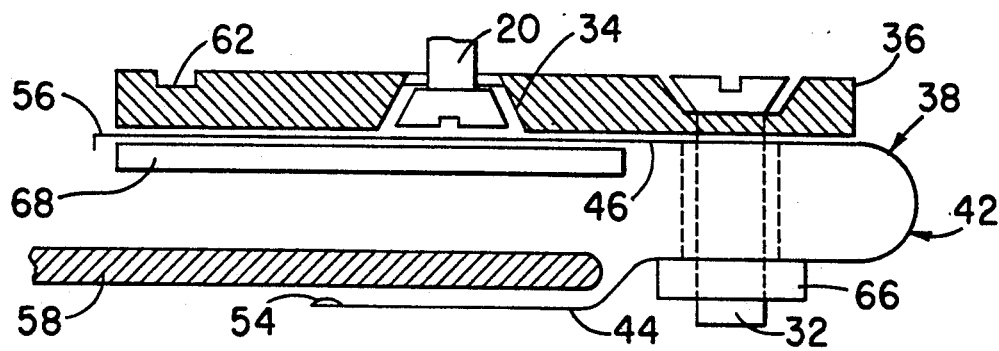
FIG. 8 is a cross-sectional view taken along line 8—8 of FIG. 6.
Figure 9:
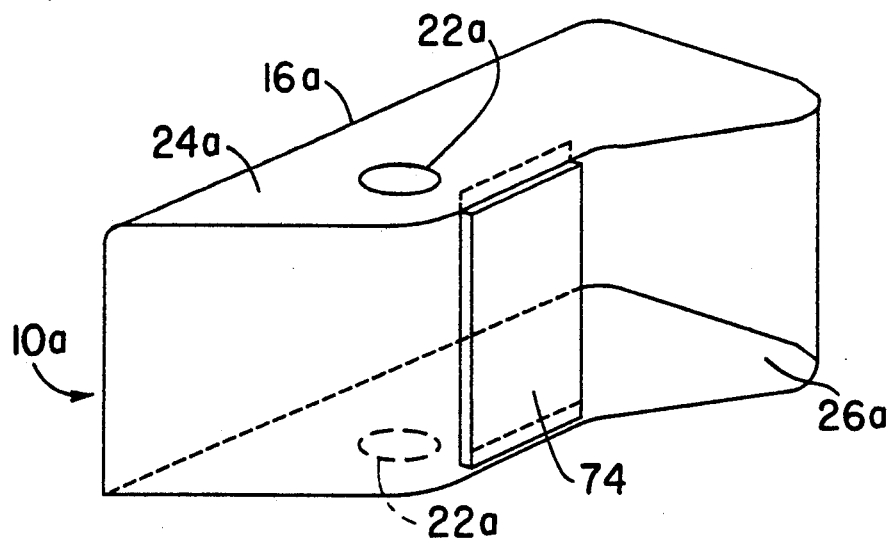
FIG. 9 is a rear perspective view of a second embodiment of an auxiliary vehicle mirror system.
Figure 10:
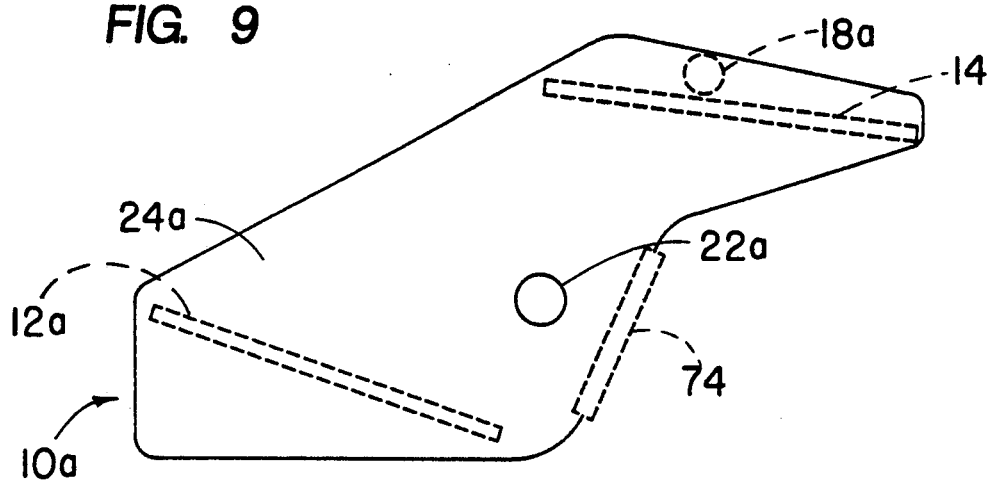
FIG. 10 is a top view of the second embodiment of the auxiliary vehicle mirror system of FIG. 9.
Figure 11:
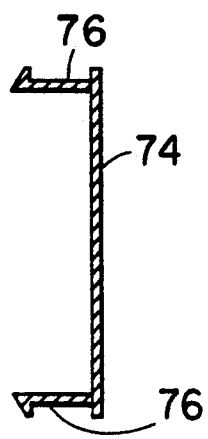
FIG. 11 is a cross-sectional side view of the clip-on cover provided for the second embodiment.
Figure 12:
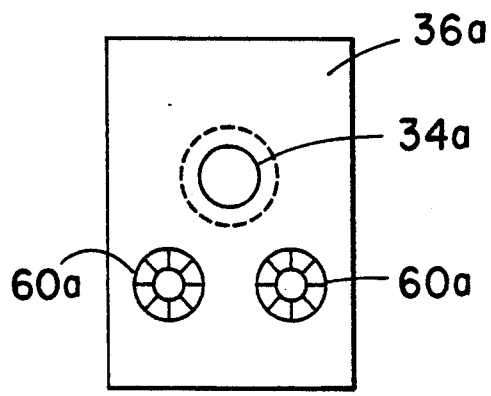
FIG. 12 is a top view similar to FIG. 6, showing the upper half of a clip or jaw used with second embodiment.
Figure 13A:
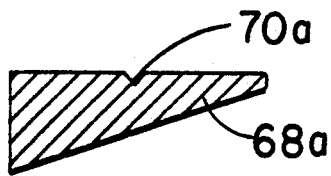
FIGS. 13A, 13B, 13C, 13D, 13E and 13F are sectional views which show a plurality of differently configured adhesive pads used with the clips or jaws of both embodiments.
Figure 14A:
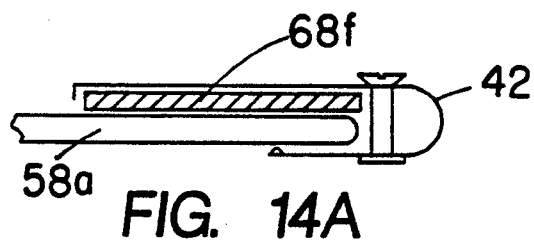
FIGS. 14A, 14B, 14C, 14D and 14E are sectional views which show how the adhesively treated pads are used with the lower half of the clip or jaw assembly of either embodiment.
Figure 13B:
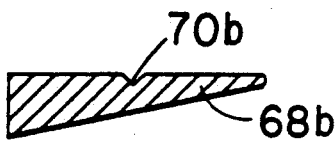
Figure 14B:
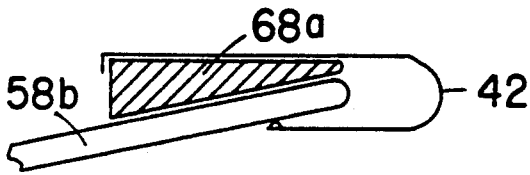
Figure 13C:
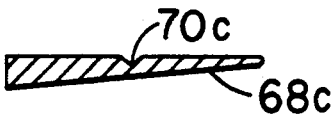
Figure 13D:
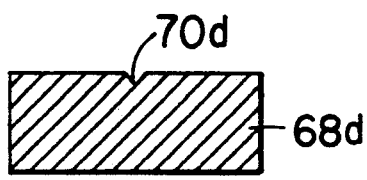
Figure 14C:
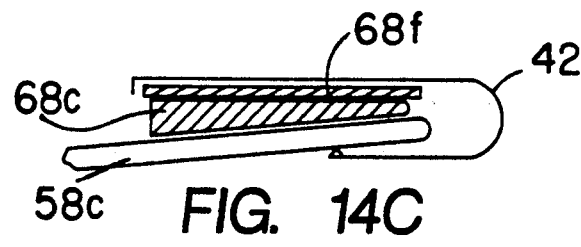
Figure 13E:
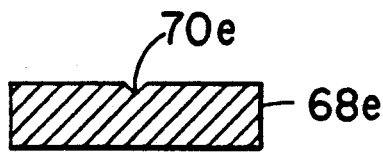
Figure 14D:
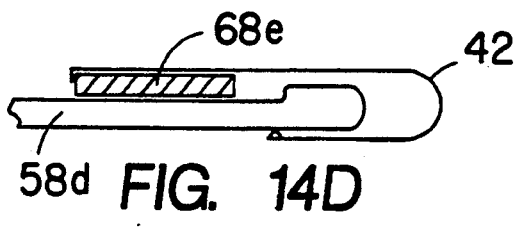
Figure 13F:
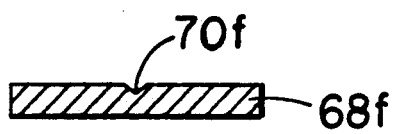
Figure 14E:
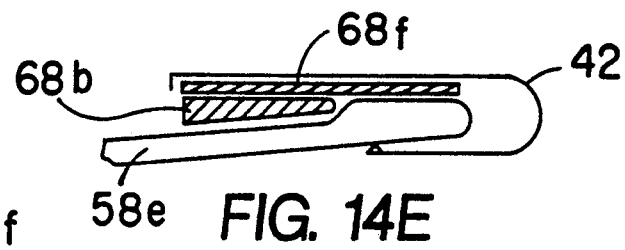

Clip or jaw 38 is formed of two components, upper jaw half 36 and lower jaw half 42. Lower jaw half 42, best shown in FIGS. 4, 5 and 8, is formed of resilient material such as spring metal, is U-shaped, with one of its arms 44 being bifurcated to provide independent and thus better clamping action due to clamping screws 32, and shorter than its other arm 46. Arm 44 is provided with two holes 48 for receiving clamping screws 32. Arm 46 is provided with a central hole 50 for providing access to mounting screw 20, and two smaller holes 52 axially aligned with holes 48 for receiving clamping screws 32. Arms 44 and 46 have in-turned lips or spikes 54 and 56 to enhance the gripping of the upper surface or wall 58 of the housing for a conventional side view mirror 78, not shown but present on the side of the vehicle.

Upper jaw half 36 of clip or jaw 38 is also formed of metal and is provided with a centrally located hole 34 aligned with hole 50 for receiving mounting screw 20, and two holes 60 aligned with holes 44 and 52 for receiving clamping screws 32. Upper jaw half 36 is also provided with an arcuate groove 62 for receiving a rotation stop screw 64 provided to limit rotation of housing 10 relative to clip or jaw 38, thereby enabling adjustment of fixed primary mirror 12.

Upper jaw half 36 is attached to lower jaw half 42 by one or two weld points (not shown) and/or by clamping screws 32 held in position by clamp nuts 66. Alternatively, holes 52 may be pierced and/or threaded to hold screws 32 in place. An adhesively secured plate 68 of plastic material is located between arm 46 and surface 58 to provide a better fit between jaw 38 and the upper surface 58 of various side view mirror housings. The presence of plate 68 will also serve to prevent screw 20 from backing off once housing 10 has been secured to clip or jaw 38.

Various configurations of plate 68 are identified as plates 68a–68f in FIGS. 13A–13F, respectively. FIGS. 14A–14E show various ways plates 68a–68f may be used to accommodate various configurations of housing surfaces 58a–58e. Each of the plates 68a–68f are provided with a snap groove 70a-70f to enable portions of the plates 68a-68f to be broken off as needed.

FIGS. 9, 10, 11 and 12 show a second embodiment of an auxiliary vehicle mirror system. Structure similar to the first embodiment is identified by the same reference numeral followed by a lower case letter.

Housing 10a is provided with a fixed primary mirror 12a and an adjustable secondary mirror 14a which is pivoted about universal pivot 18a. Top surface 24a and bottom surface 26a are provided with mounting screw holes 22a as in the first embodiment. Omitted from the surfaces 24a and 26a are holes equivalent to holes 28 and 30 because such holes are not needed in the second embodiment. It is contemplated that mounting screw 20 will be inserted from the top of housing 10a to engage the threaded equivalent of hole 34 in upper jaw half 36. Similarly, access holes 30 are not required in the second embodiment since jaw 38 can be mounted on upper surface 58 prior to attaching housing 10a to jaw 38. Similarly, groove 62 is omitted from upper jaw half 36a. Holes 34a and 60a are included in upper jaw half 36a, with hole 34a being threaded to receive the end of mounting screw 20, thereby enabling screw 20 to perform the function of rotation stop screw 64 by loosening and tightening screw 20 to permit or inhibit the rotation of housing 10a relative to jaw 38. Alternatively, a thin friction washer (not shown) formed of neoprene, rubber or some other high friction material may be inserted on mounting screw 20 between bottom surface 26a of housing 10a and upper jaw half 36a to inhibit rotation of housing 10a. Also, the bottom surface 26a and the surface of upper jaw half 36a may be provided with matching patterns of shallow radial grooves and crests (not shown) which cooperate to provide friction and resistance against rotation.

As shown in FIG. 2, the first embodiment may be provided with fins 72 to obscure the view through front window 16 which may be confusing to the driver. A similar function is provided in the second embodiment by a clip-on cover 74 held in position by clip hooks 76.

While it will be apparent that the preferred embodiments of the invention herein disclosed are well calculated to fulfill the objects above-stated, it will be appreciated that the invention is susceptible to modification, variation and change without departing from the proper scope of fair meaning of the subjoined claims.

I claim:

1. An auxiliary vehicle mirror system mounted on an upper wall of a housing covering a side view mirror on a vehicle, said mirror system comprising:
    an auxiliary vehicle mirror system housing having a front window;
    a primary mirror fixedly mounted in said mirror system housing to receive a view through said front window of road conditions forward of said vehicle;
    an adjustable secondary mirror mounted on a universal pivot in said mirror system housing to receive an image of said view of road conditions from said primary mirror and to transmit said image to a driver of said vehicle;
    means to pivotally mount said auxiliary vehicle mirror system housing on a mounting jaw; and
    means to attach said mounting jaw on said top wall of said housing covering said side view mirror; whereby
    a driver is provided with a view of forward road conditions when a direct line of sight is obstructed by other vehicles.

2. An auxiliary vehicle mirror system as in claim 1, further including means for blocking a straight line of sight through said front window between said primary mirror and said secondary mirror.

3. An auxiliary vehicle mirror system as in claim 2, wherein said means for blocking comprises a plurality of parallel fins extending internally from said front window towards said primary mirror.

4. An auxiliary vehicle mirror system as in claim 2, wherein said means for blocking comprises a clip-on cover.

5. An auxiliary vehicle mirror system as in claim 1, said means to pivotally mount said auxiliary vehicle mirror system housing on said mounting jaw comprises a mounting screw hole on a top surface and a bottom surface of said mirror system housing, a mounting screw hole in said jaw, a mounting screw inserted through said holes in said bottom surface and in said jaw, and means for holding said mounting screw in an inserted position.

6. An auxiliary vehicle mirror system as in claim 5, said means for holding comprising a mounting screw nut.

7. An auxiliary vehicle mirror system as in claim 5, said means for holding comprising adhesively mounted plate means positioned between said jaw and said top wall of said housing covering said side view mirror.

8. An auxiliary vehicle mirror system as in claim 1, said jaw comprising an upper jaw half and a lower jaw half suitably connected to adjustably clamp said upper wall of said housing covering said side view mirror.

9. An auxiliary vehicle mirror system as in claim 8, said upper jaw half comprising a metal plate having a mounting screw hole and a pair of clamping screw holes;
    said lower jaw half comprising a U-shaped clip formed of resilient metal with a bifurcated lower leg provided with a first pair of clamping holes and a first lip, an upper leg provided with a second pair of clamping holes axially aligned with said first pair of clamping holes, a mounting screw hole, and a second lip;
    said upper jaw half being connected to said lower jaw half by clamping screws passing through said first and second pair of clamping holes;
    and clamping nuts being provided on said clamping screws; whereby
    said mounting jaw may be securely attached to said upper wall of said housing covering said side view mirror.

10. An auxiliary vehicle mirror system as in claim 9, wherein said upper jaw half further comprises a groove engageable with a rotation stop screw threaded through a bottom surface of said mirror system housing to limit rotational adjustment of said mirror system housing.

11. An auxiliary vehicle mirror system as in claim 9, said mounting screw hole being threaded, said means to pivotally mount said auxiliary mirror system housing comprising a mounting screw mounted though a mounting screw hole in a bottom surface of said mirror system housing so as to engage said threaded mounting screw hole, whereby pivoting of said mirror system housing may be limited by tightening and loosening said mounting screw in said threaded mounting screw hole.

12. An auxiliary vehicle mirror system as in claim 9, wherein said upper jaw half and a bottom surface of said mirror system housing are provided with means to limit rotational adjustment of said mirror system housing.

13. An auxiliary vehicle mirror system as in claim 1, wherein said means to pivotally mount said auxiliary vehicle mirror system housing on a mounting jaw comprises:
- a top surface and a bottom surface on said mirror system housing;
- a mounting screw hole in said surface and said bottom surface for selectively receiving a mounting screw, said mounting screw holes being centrally located and axially aligned;
- axially aligned access holes in said top surface and said bottom surface for selectively providing access to jaw clamping screws; and
- axially aligned threaded rotation stop screw holes in said top surface and said bottom surface of selectively receiving a rotation stop screw; whereby
- said mirror system housing may be selectively mounted on the left side and right side of the vehicle.

14. An auxiliary vehicle mirror system as in claim 1, said means to pivotally mount said auxiliary vehicle mirror system housing on a mounting jaw comprises:
- a top surface and a bottom surface on said mirror system housing;
- a mounting screw hole in said top surface and said bottom surface for selectively receiving a mounting screw;
- said mounting jaw including a mounting screw hole in an upper jaw half; and
- at least one of said mounting screw holes being threaded; whereby
- said mirror system housing may be mounted on the left side and right side of said vehicle.

15. An auxiliary vehicle mirror system mountable on an upper wall of a first housing covering a side view mirror on a vehicle, said mirror system comprising:
- a second housing having a top surface, a bottom surface and a front window;
- a primary mirror fixedly mounted in said second housing to receive a view through said front window of road conditions forward of said vehicle;
- an adjustable secondary mirror pivotally mounted on a universal pivot in said second housing to receive an image of said view of road conditions from said primary mirror and to transmit said image to a driver of said vehicle;
- a mounting jaw mountable on an upper wall of said first housing;
- means to pivotally mount said second housing on said mounting jaw, including a mounting screw, a first mounting screw hole in said top surface, second mounting screw hole in said bottom surface axially aligned with said first mounting screw hole, and a third mounting screw hole in an upper portion of said mounting jaw, whereby said second housing may be selectively mounted on the left and right side of the vehicle;
- said mounting jaw including an upper jaw half comprising said upper portion, and a lower U-shaped jaw half formed of resilient mental and having an upper leg and a lower leg, said lower leg being bifurcated to provide access to said mounting screw, said lower leg being shorter than said upper leg, said upper and lower legs being provided with means to enhance gripping of said upper wall of said housing, said upper leg including a first pair of clamping screw holes, said lower legs having a second pair of clamping screw holes said first and second pairs of clamping screw holes being respectively axially aligned, and a pair of clamping screws and clamping nuts, whereby said jaw may be mounted on said upper wall of said first housing; and
- and a suitably configured adhesively coated means interposed between said upper leg of said lower jaw half and said upper wall to enhance the mounting of said jaw on said upper wall.

16. An auxiliary vehicle mirror system as in claim 15, said top surface and said bottom surface being further provided with axially aligned clamping screw access holes and with rotation stop screw holes for selectively receiving a rotation stop screw;
- said upper jaw half including an arcuate groove in an upper surface thereof for receiving said rotation stop screw.

17. An auxiliary vehicle mirror system as in claim 15, including means for blocking extraneous images through said front window from the driver.

18. An auxiliary vehicle mirror system as in claim 17, said means for blocking comprising fins suitably located within said second housing.

19. An auxiliary vehicle mirror system as in claim 17, said means for blocking comprising a clip-on cover for said second housing.

* * * * *